United States Defensive Publication [19] (H) [11] T961,006

Brown et al. [43] Aug. 2, 1977

[54] OIL WELL COMPLETION WITH HIGH SUBMERGENCE JET PUMP

[75] Inventors: Francis Barton Brown, La Crescenta; Phillip M. Wilson, Downey, both of Calif.

[73] Assignee: Kohe, Inc., Huntington Park, Calif.

[21] Appl. No.: 667,135

[22] Filed: Mar. 15, 1976

Related U.S. Application Data

[60] Continuation of Ser. No. 506,251, Sept. 16, 1974, abandoned, which is a division of Ser. No. 381,863, July 23, 1973, abandoned.

[51] Int. Cl.[2] ..... F04F 5/44

[52] U.S. Cl. ..... 417/196

[57] ABSTRACT

An oil well completion comprising a well bore drilled from the surface through and below an oil producing formation to provide an extension below the producing formation, a jet pump in the extension below and in communication with the producing formation, means for conducting power fluid under pressure downwardly in the well bore from the surface to the jet pump, and means for conducting spent power fluid, and fluid from said producing formation discharged by said jet pump, upwardly in the well bore from the jet pump to the surface. The purpose of locating the jet pump in a downward extension of the well bore below the producing formation is to provide sufficient submergence of the jet pump to avoid cavitation, without curtailing the flow of fluid from the producing formation into the well bore.

6 Claims, 1 Sheet Drawing,

10 Pages Specification

The file of this unexamined application may be inspected and copies thereof may be purchased (849 O.G. 1221, Apr. 9, 1968).

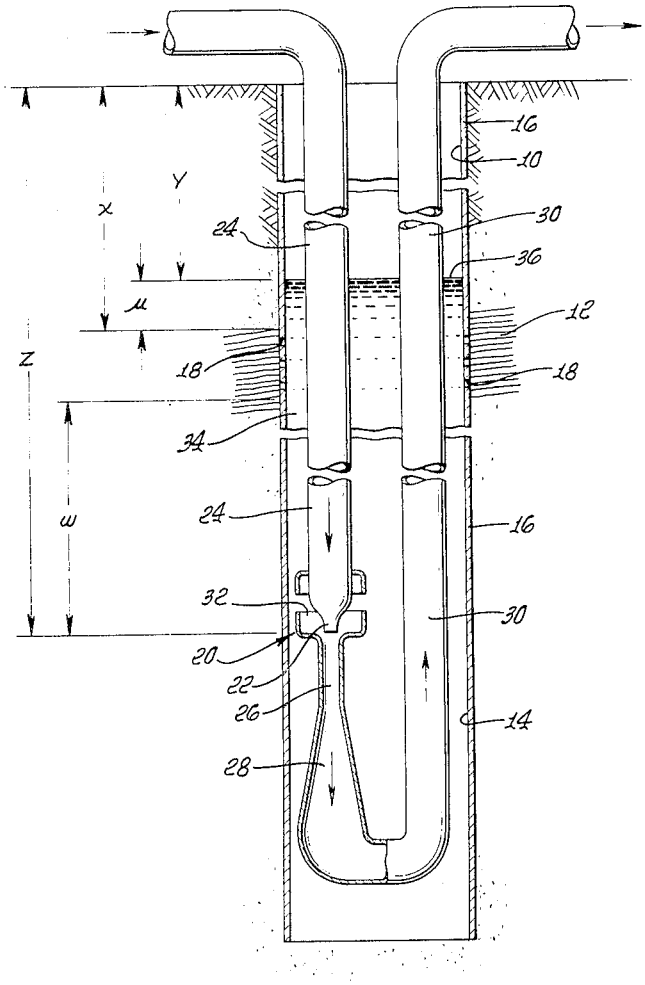

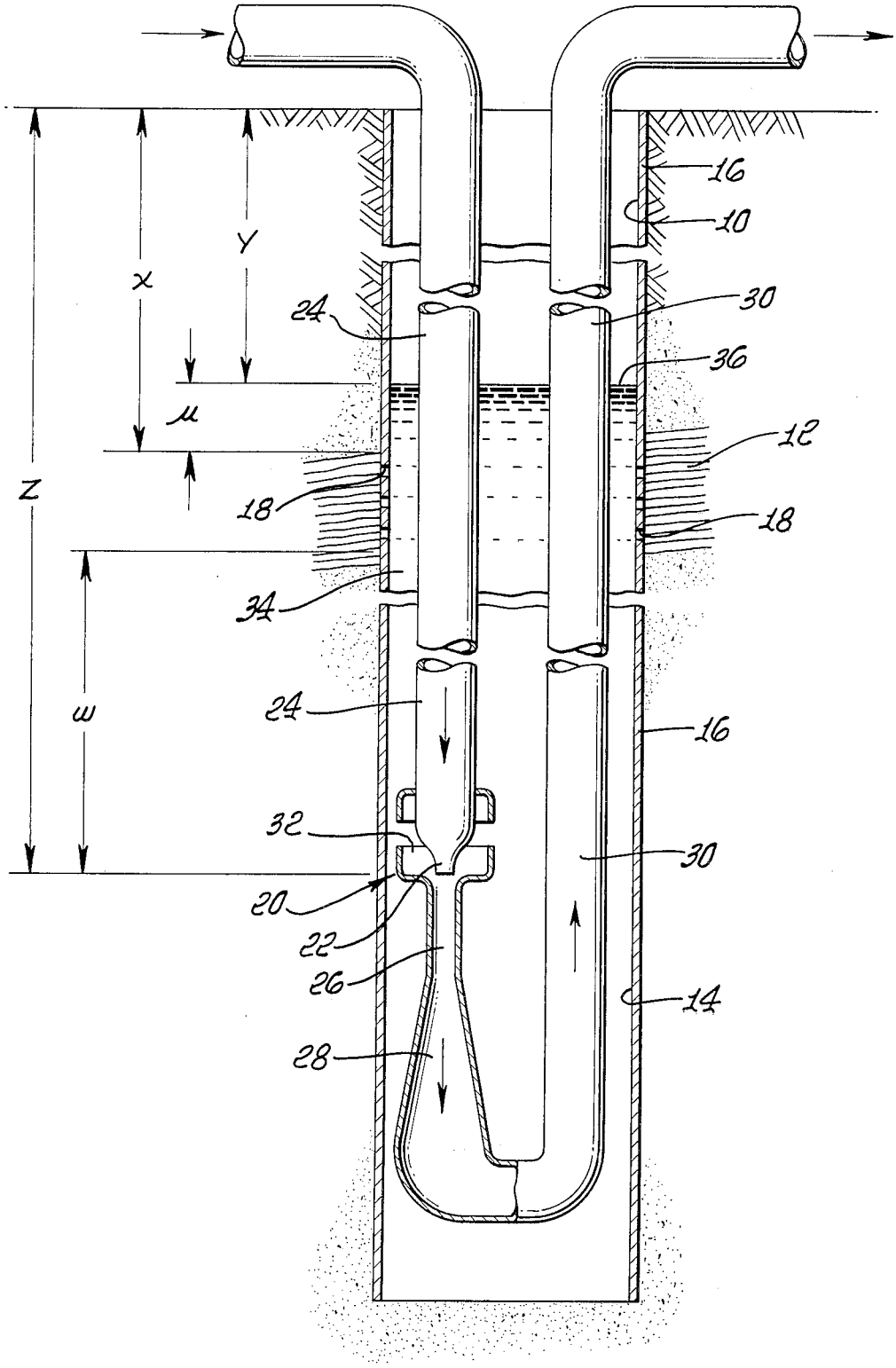
16
10
Y
X
24
30
36
μ
12
Z
18
18
34
24
16
W
32
30
20
22
26
14
28